(No Model.)  10 Sheets—Sheet 1.

J. G. PEARCE.
COMBINED AUTOMATIC BLOCK AND SIGNAL SYSTEM AND BRAKE AUTOMATIC APPLIANCE.

No. 592,120.  Patented Oct. 19, 1897.

(No Model.) 10 Sheets—Sheet 2.

J. G. PEARCE.
COMBINED AUTOMATIC BLOCK AND SIGNAL SYSTEM AND BRAKE AUTOMATIC APPLIANCE.

No. 592,120. Patented Oct. 19, 1897.

Witnesses,

Inventor
James G. Pearce
By Dewey & Co.
Attys (No Model.) 10 Sheets—Sheet 4.
J. G. PEARCE.
COMBINED AUTOMATIC BLOCK AND SIGNAL SYSTEM AND BRAKE AUTOMATIC APPLIANCE.
No. 592,120. Patented Oct. 19, 1897.

(No Model.) 10 Sheets—Sheet 5.

J. G. PEARCE.
COMBINED AUTOMATIC BLOCK AND SIGNAL SYSTEM AND BRAKE AUTOMATIC APPLIANCE.

No. 592,120. Patented Oct. 19, 1897.

Witnesses,

Inventor
James G. Pearce
By Dewey & Co.
Attys (No Model.)  10 Sheets—Sheet 8.

J. G. PEARCE.
COMBINED AUTOMATIC BLOCK AND SIGNAL SYSTEM AND BRAKE AUTOMATIC APPLIANCE.

No. 592,120.  Patented Oct. 19, 1897.

Witnesses,

Inventor,
James G. Pearce
By Dewey & Co.
Attys.

UNITED STATES PATENT OFFICE.

JAMES G. PEARCE, OF OAKLAND, CALIFORNIA.

COMBINED AUTOMATIC BLOCK AND SIGNAL SYSTEM AND BRAKE AUTOMATIC APPLIANCE.

SPECIFICATION forming part of Letters Patent No. 592,120, dated October 19, 1897.

Application filed April 3, 1893. Serial No. 468,891. (No model.)

*To all whom it may concern:*

Be it known that I, JAMES G. PEARCE, a citizen of the United States, residing in Oakland, county of Alameda, State of California, have invented an Improvement in a Combined Automatic Block and Signal System and Brake Automatic Appliance; and I hereby declare the following to be a full, clear, and exact description of the same.

My invention relates to a device which I call a "railway signal and brake-actuating device."

It consists in certain details of construction which will be more fully explained by reference to the accompanying drawings, in which—

Fig. 7 is an enlarged sectional view of one of the depression-levers and its connections. Fig. 8 illustrates the contacts $e^5 f^5$ and $g^5 g^6$.

Figure 1:
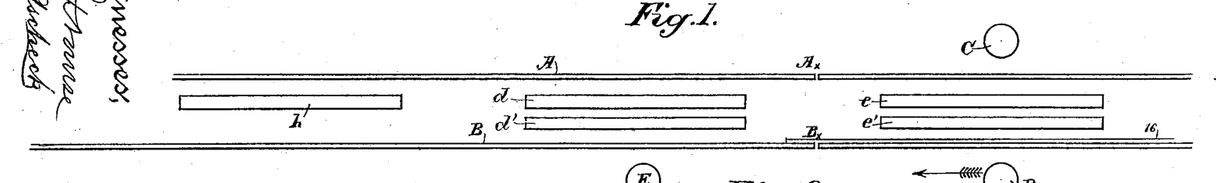
Figures 1, $1^a$, $1^b$, $1^c$, $1^d$, $1^e$, and $1^f$, on successive sheets from 1 to 7, are a plan view of the track, showing the positions of the different operating-levers.
Figures 1, 2:
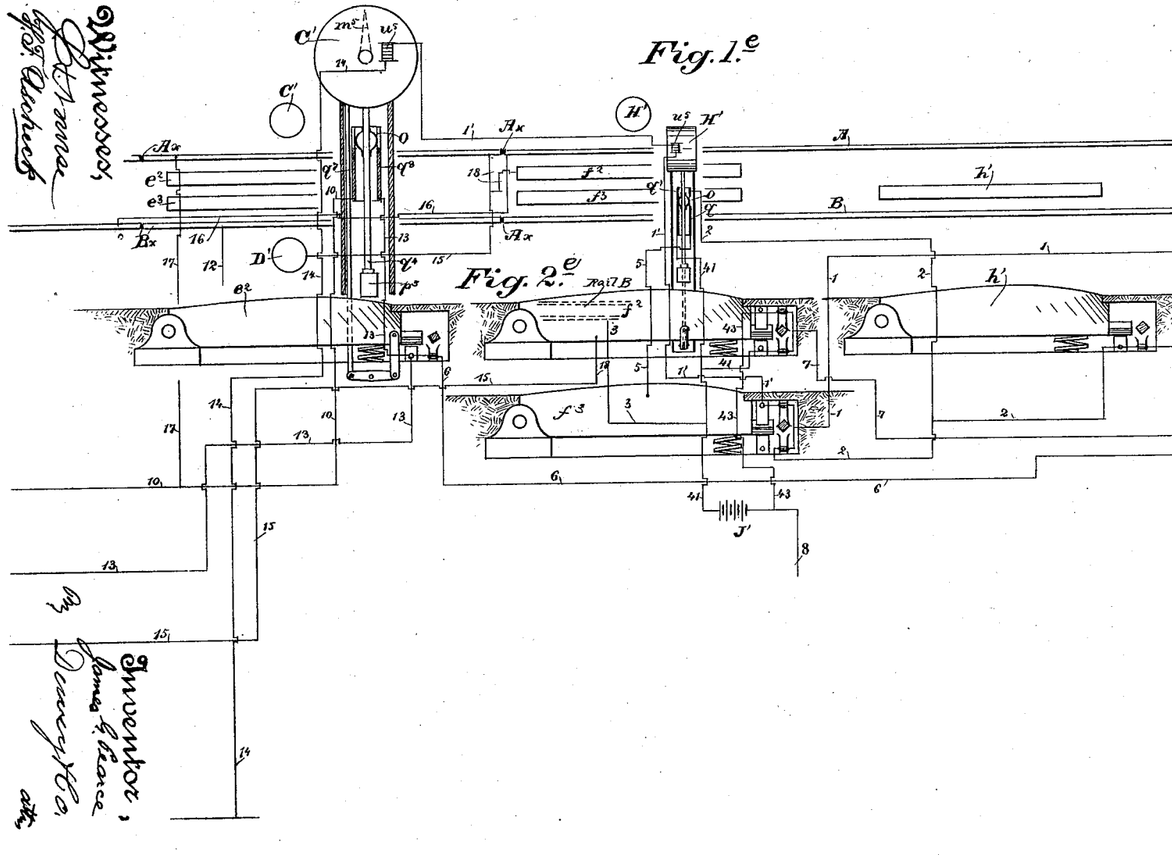
Figs. 2, $2^a$, $2^b$, $2^c$, $2^d$, $2^e$, and $2^f$, extending through the same sheets, are side elevations and sections showing the various levers and the connecting mechanisms through which they operate the visible signals, the brake mechanism upon the train, and the resetting mechanisms after a train has passed.
Figures 1A, 2A:
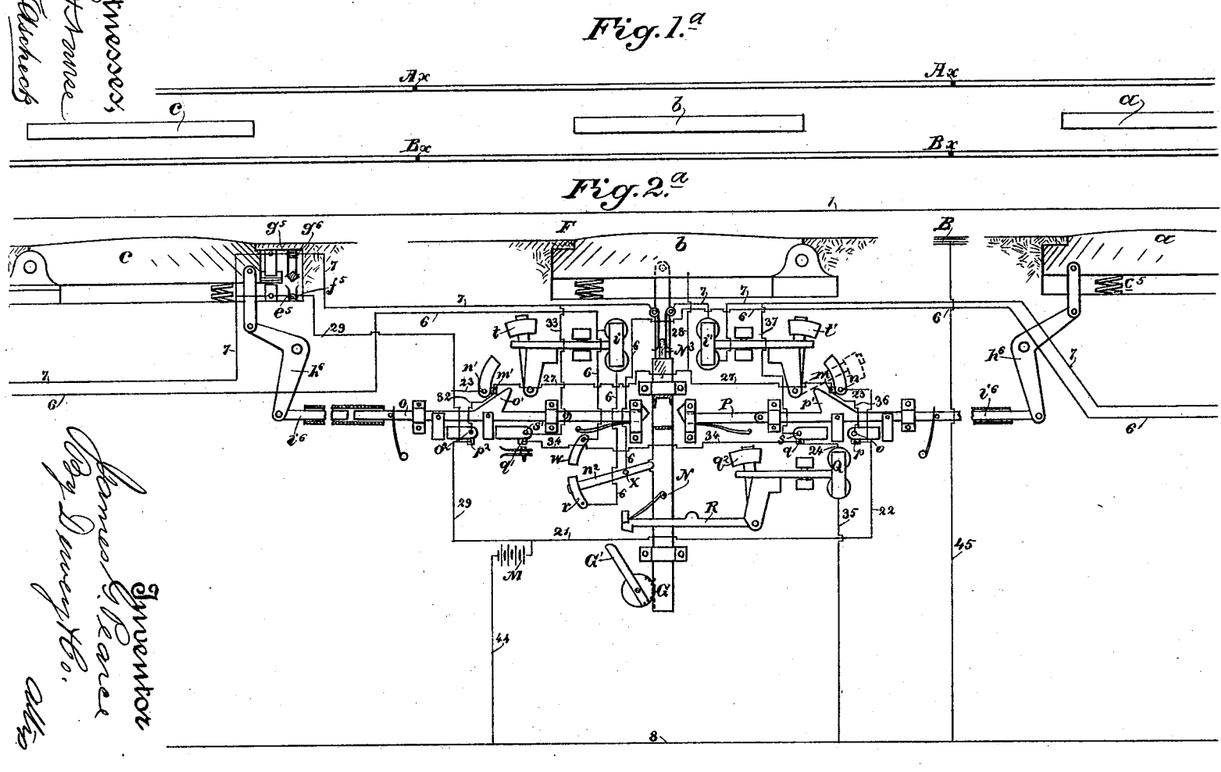
Figure 1C:
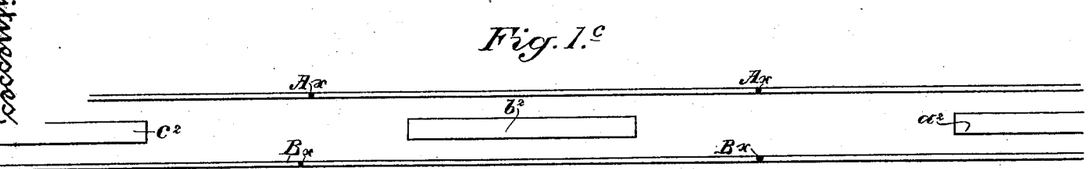
Figure 2:
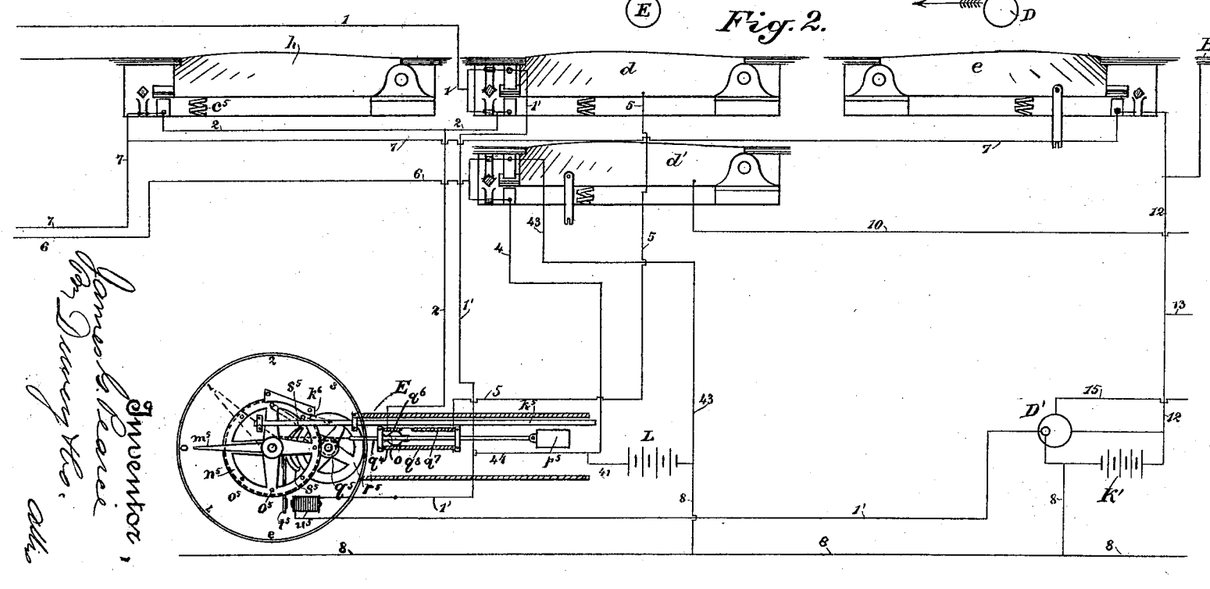
Figure 2C:
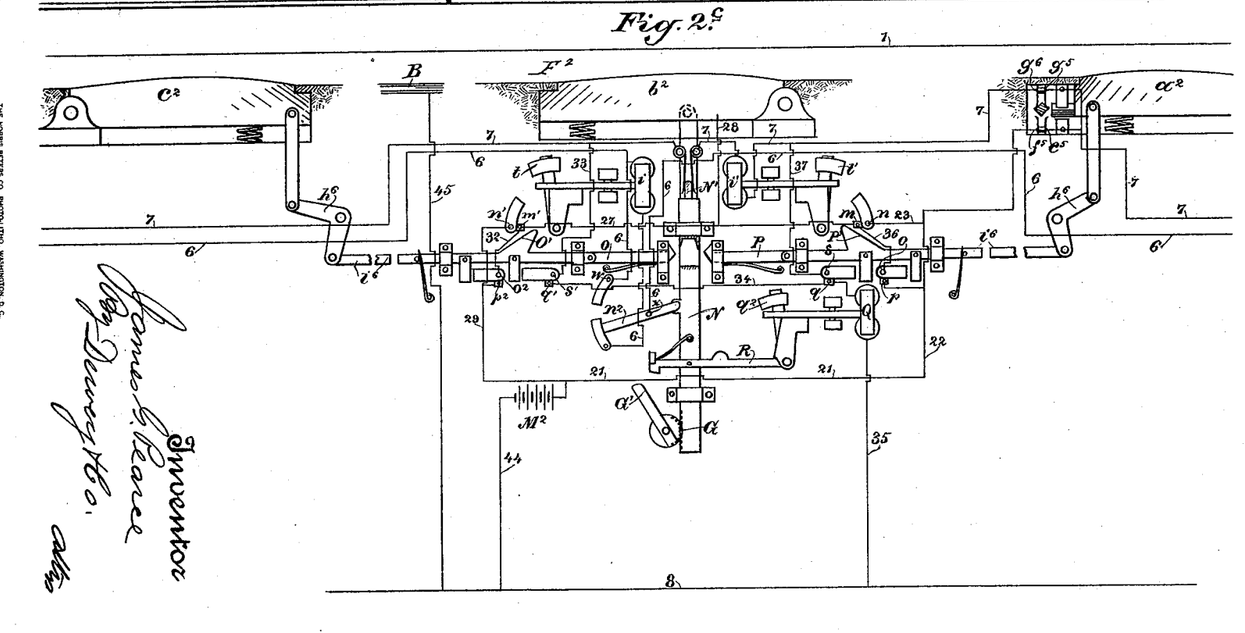

An enlarged view of the mechanism by which one of the dial-signals is actuated is shown in the lower part of Sheet 1 of the drawings and its connection with the operating mechanism of Fig. 2, Sheet 1. The signaling devices in each of the signals are actuated in a similar manner and are not again fully illustrated.

The object of my invention is to guard railway-trains from collision by the employment of a series of block-signals distributed along a line of railway, these signals serving, first, to show when a train leaves the station at one end and enters the block and when it arrives at the end of the block.

It also has for its object the application of brakes to any train entering the said block from the opposite direction, so as to prevent its further progress while the first-named train is within the block and to similarly apply the brakes to any train following too closely. These operations are effected by means of a series of depressible levers situated at intervals between the rails of the track and in such positions that they will be successively acted upon by a drum or roller fixed upon the engine-shaft so as to form contact with these levers as the train passes over them, each lever being connected so as to operate a mechanism which either sets a signal at "danger" or returns it to the position of "clear."

Other sets of levers actuate mechanisms by which the electrical current is successively cut off from those levers which act upon the brake mechanism of the train, so that the train may pass over said levers without being affected, and after the train has thus passed these levers another set of mechanisms are successively actuated to again return the current to said levers and also to set the mechanisms already passed over into condition to act on the brakes of any following train which may approach the first train within the danger limit.

It will be understood that the single block or section represented in the accompanying drawings may be repeated as often as necessary throughout the line, and these blocks or sections may be of any desired length.

The lines of track A and B are divided between depression-levers, as by insulated divisions $A^\times$ $B^\times$, &c., into insulated rail-sections.

Upon the sides of the track, at a convenient position relative thereto, are fixed signals H C, &c., (C being at the beginning of one block and H at the end of the preceding block,) which are operated when the train is passing in one direction, and D, E, and D' are similar signals upon the opposite side of the track which would be operated when the train was passing in the opposite direction.

For convenience in description and to prevent confusion from the introduction of so large a number of mechanisms and connections I have here shown the apparatus complete for operation by means of a train moving in one direction—that is, from right to left—and do not refer to the signals and levers actuated by trains from the left except where they serve for station protection. Between the line of the rails are situated a number of depressible levers which actuate various mechanical and electrical devices to be hereinafter described. Certain ones of these levers, as $a$, $b$, and $c$, $a'$ $b'$ $c'$, &c., are situated centrally between the lines of track, while the levers $e$ $d$ $h$ $f^2$, &c., are situated a little to one side of the center and nearer to the rail A. One set of these last-named levers $e$ $d$ $h$ is operated by the train which passes in one direction—viz., from right to left—while the other set, situated nearer to the rail B, will be correspondingly operated by the train passing from left to right, but, as before stated, I shall in the present case confine myself to the operation by a train passing from right to left. These levers are all actuated by a drum or roller $a^5$, Fig. 4, fixed upon the engine shaft or axle. This drum is of such diameter that it will contact with any of the levers which it may pass over when the levers are in their normal position. The length of the drum in the line of its axis is such that while one end of it will contact successively with each of the levers $a$ $b$ $c$, and which are in the central line between the tracks, the other end, which projects to the right of the center, will contact with the levers $e$ $d$ $h$, which are nearer to the right-hand track A as the train proceeds from right to left, or when the locomotive has been turned around so as to proceed in the opposite direction from left to right it will be manifest that this projecting end of the drum will then contact with the levers $e'$ $d'$, &c., which are nearer to the rail B, but will not contact with the other levers $e$ $d$ $h$, &c. The levers $e$ $d$ $h$ are all situated within a short distance of the "station," as I have called it, which forms the commencement of each block, and are actuated successively by the train when it leaves the station. These are called "station-levers." The other levers $a$ $b$ $c$ $a'$ $b'$ $c'$ are placed in groups of three at intervals along the line between the stations or ends of the block.

Figure 3:
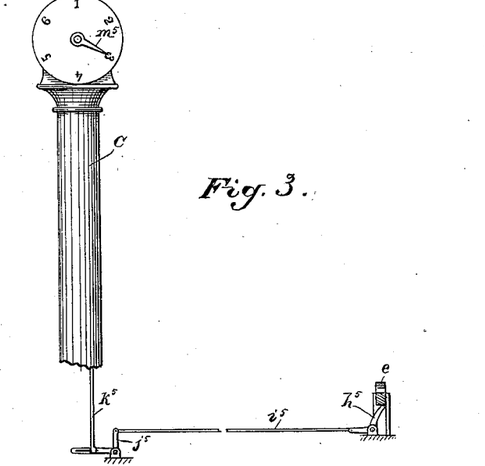
Fig. 3 is a partial view showing one of the signals in elevation, with a section showing the connection between the actuating mechanism and the depression-lever in the line of the track.

When the train has reached a station or the commencement of a block, it will, by engaging a lever $f$ corresponding to $f^2$ of the following block, have returned the last signal H of the preceding block to "safety" or "clear," while the signal C at that station still remains in the danger position while the train is at that station. As soon as the train leaves the station and enters the following block, it first passes over the lever $e$, and this acts through the connected mechanism to return the visible indicator or signal at C to its normal position of "clear." This lever $e$ actuates the bell-crank lever (shown in Fig. 3) to return the signal C, as hereinafter described. As the train continues, it reaches the lever $d$, and this, when depressed, acts through its electrical connections to set the indicators H' at the opposite end of the block upon which the train is entering, and C' of the following block, to show that the train is within that section. These signals remain in this condition until the train has reached the end of this block or section, and when it passes out they will be returned to their normal position in the same manner that the signals H and C were returned, as just described.

At each of the points where the groups of levers $a$ $b$ $c$ are situated is a mechanism whose purposes and operations will be hereinafter described. These mechanisms are marked F F' F² F³. When the train passes over the lever $h$, which is the last of the group which I term "station-levers," it acts through its connecting-wires upon all of these mechanisms at F F', &c., to energize the magnets $i'$ $i'$, &c., to close a local-track circuit at each group, including a battery M and one of the levers $b$, and thus prepare them to stop any train approaching from the opposite direction. The results produced by these actions will be more fully described hereinafter. This circuit being completed, either of these levers would act upon an engine or train approaching from the opposite direction through its drum $a^5$, and thus would act to automatically set the brakes upon this train, stopping it, and thus signaling the engineer that another train was approaching from the opposite direction. When the train from the right passes over the first of the levers $a$, it acts through the connected mechanism F to cut off the current by breaking the local circuit at $m$ $n$ from the lever $b$ of that group, and this allows the train moving from the right, as before described, to pass over that lever without any action or setting of the brakes on that train. When the train passes over the final lever $c$ of this group, it acts through the mechanism F by bridging the contacts $o^2$ $p^2$ to again connect the current through the lever $b$, which has been passed, thus placing it in condition to again act upon a train which may be following from the rear and apply its brakes. Each set of levers $a'$ $b'$ $c'$, &c., succeeding to this first set, are in like manner acted upon until the end of the block or section has been reached; and as the third set of levers are thus passed over, they act by an electrical connection to return the first mechanism F to its normal condition, showing the line to be clear, while the two mechanisms between remain in condition to stop any following train. This releasing of each third mechanism also relieves its lever $b$ of the electrical current, which would otherwise apply the brakes to the following train.

The depressible levers which are fixed between the rails of the track have preferably an upper convex surface which normally stands high enough so that a drum $a^5$ upon the engine-shaft will depress them as the engine passes over them. A spring $c^5$ beneath the lever raises it to its normal position immediately after the wheel has passed.

Figures 4, 5:
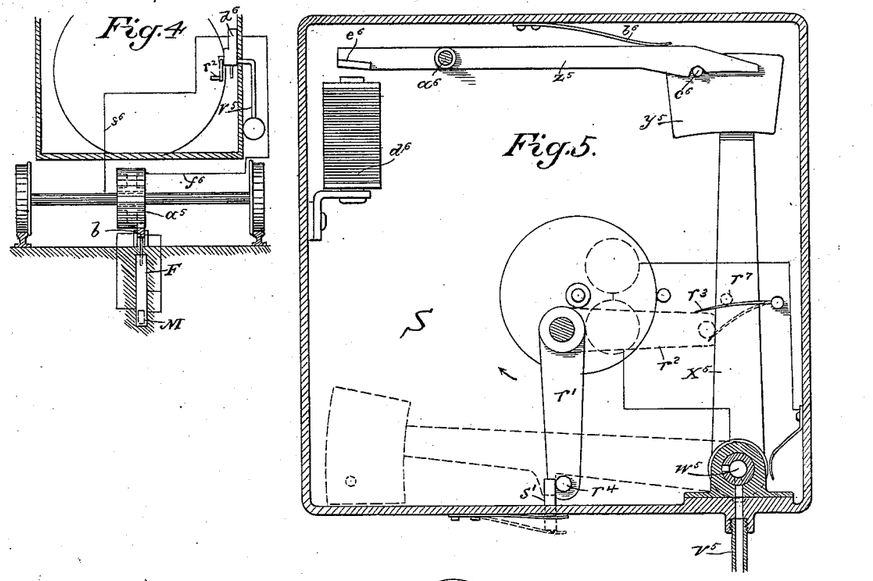
Fig. 4 is a transverse section showing the rails and the engine with the drum or roller by which the depression-levers between the rails are actuated.
Fig. 5 is an enlarged view of the mechanism upon the engine by which the air-valve is opened to automatically apply the brake.
Figure 6:
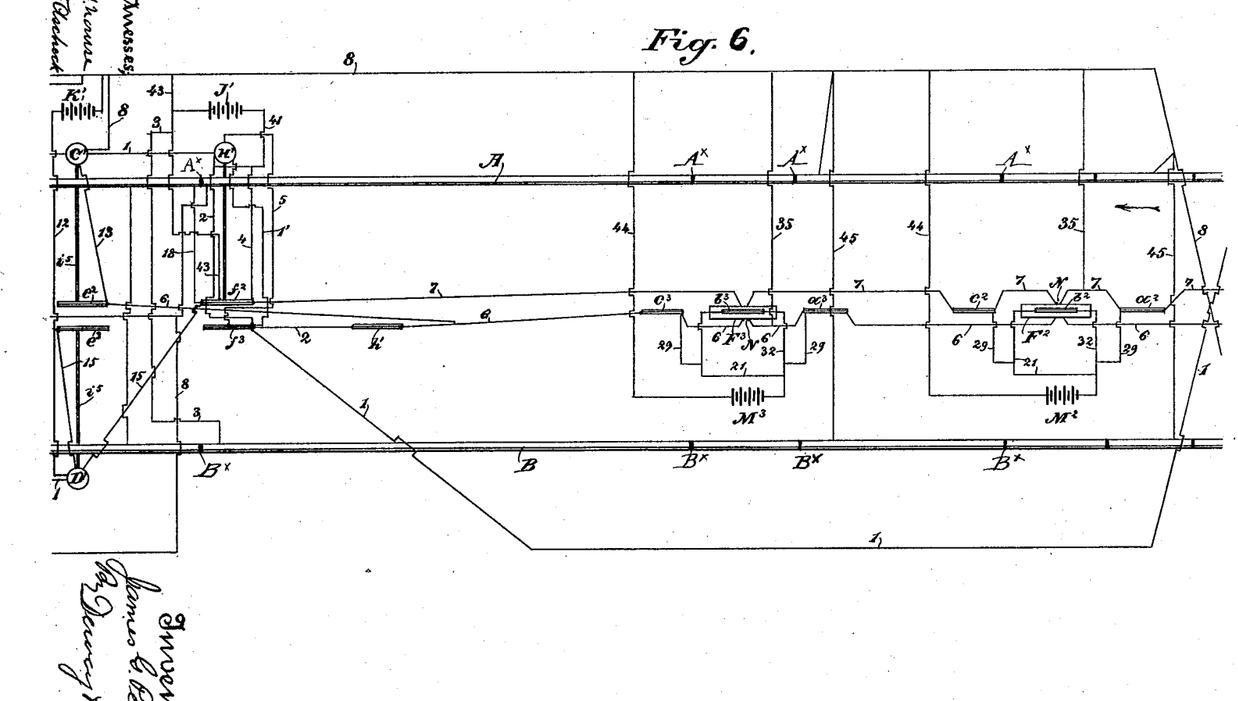
Figs. 6 and $6^a$, Sheets 8 and 9, show a diagrammatic view of one block, showing the last signal H of the preceding block and the first signal C' of the following block.
Figures 6A, 7, 8:
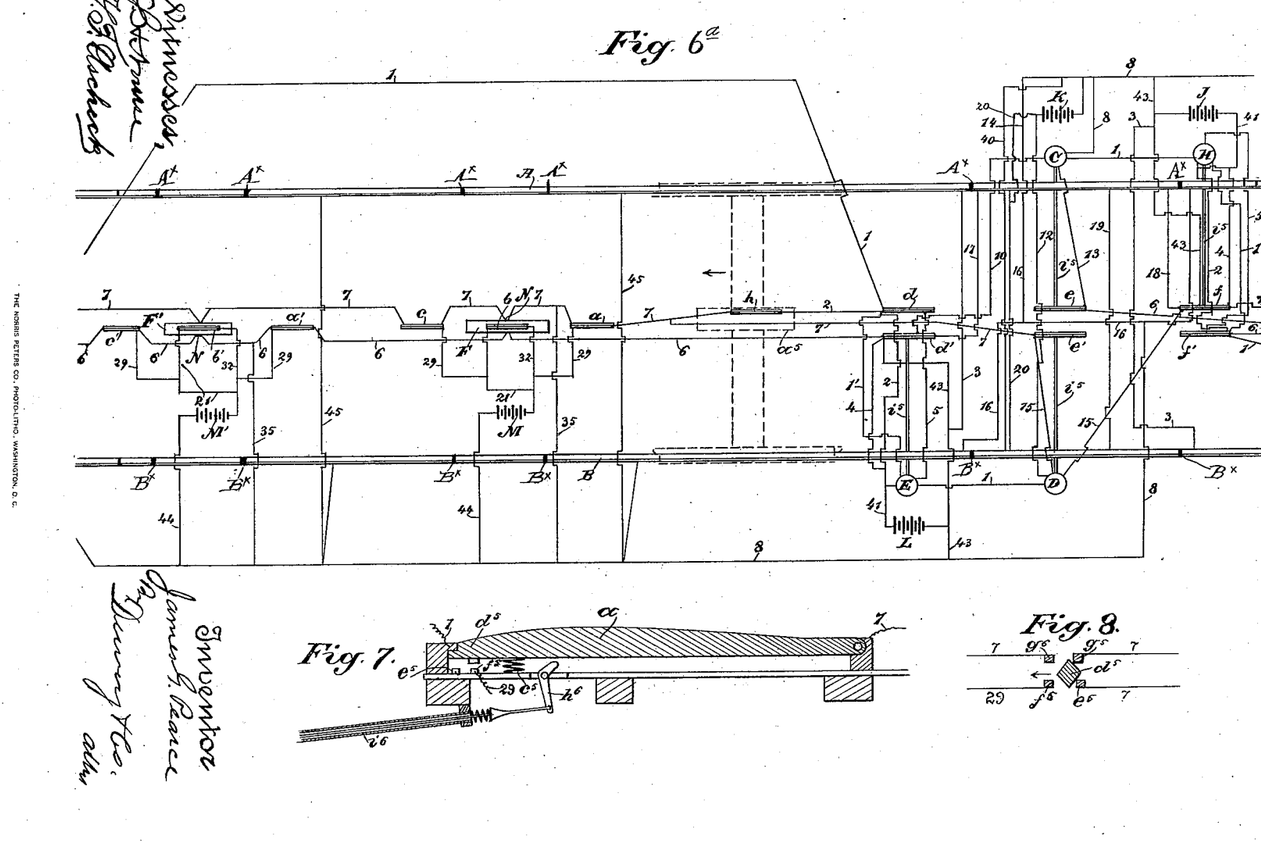

The mechanism upon the engine is constructed as follows: The drum $a^5$ upon the axle of the engine-wheels is insulated from this axle and a wire $f^6$ forms a contact with this drum and extends to a magnet $d^6$. The other portion of the wire extends from the magnet and forms a contact with the engine-wheel axle upon which the drum is secured, and through this axle the wheels and the rails complete a circuit. As long as the drum $a^5$ remains out of contact with a track-lever—such as $b\, b'$, &c.—(which would connect it with a local battery at the point where the lever is situated) no operation of the air-valve mechanism upon the train will take place; but whenever the drum forms contact with any of these levers which will form a connection with the battery a circuit is completed which immediately energizes the magnet $d^6$ upon the engine and operates to open the air-valve, as will be hereinafter described. Upon the engine and connected with the pipe $v^5$, which leads to the brake-cylinders throughout the train, is a valve $w^5$. This valve, as shown in the present case, is a rotary one, and is fixed within a pipe or passage through which air from the train-pipe is discharged. The valve has a single port or opening through it, and when it is turned so that this port coincides with the passage of the pipe $v^5$ it allows the air to pass. When in any other position, the air is cut off. The normal position of this valve is closed, as shown in Fig. 5. A lever-arm $x^5$ is fixed to the valve-stem, and when the lever-arm is in a vertical position, as here shown, the valve-port stands in such position that the valve will be closed. Upon the upper end of the lever-arm $x^5$ is a weight $y^5$.

$z^5$ is a lever having a fulcrum-pin at $a^6$. A spring $b^6$ holds the notch in the movable end of the lever in engagement with a pin $c^6$ on the side of the weight $y^5$, and thus keeps the weight and lever normally in the position shown by the full lines.

$d^6$ is a magnet, and an armature $e^6$ on the end of the lever $z^5$ is drawn into contact with the magnet whenever the magnet is energized. This operation disengages the opposite end of the lever from the pin $c^6$, and the weight $y^5$ is immediately allowed to fall. When it falls, it acts by means of its arm $x^5$ to turn the valve $w^5$ so as to open the communication through the air-passage to the train-pipe, and thus the brakes will be immediately applied in the usual manner.

Through the casing S of the above-described mechanism passes a shaft carrying an interior crank $r'$ and an exterior crank $r^2$, the outer one having a handle by which it is turned, so as to return the parts to an operative position at any time after they have been in action. The arm $r'$ has a pin $r^4$, which forms contact with a spring-controlled lug $S'$. When the magnet $b^6$ has been energized and the arm $x^5$ caused to drop to the bottom of the case, the arm will depress the lug $S'$, and thus free the arm $r'$.

The weighted arm $x^5$ is retained in an approximately vertical position by the armature-lever $z^5$, and when the magnet $d^6$ is energized this lever $z^5$ is moved to disengage a notch in it from the pin $c^6$ on the weight $y^5$. This being released swings the arm $x^5$ down around its pivotal point into the position shown in dotted lines. The arm $r'$, which had up to this time been locked to prevent its being turned by the spring-pressed stop $S'$, is now released by the pressure of the weighted arm $x^5$ upon the stop. The exterior crank $r^2$ is shown in dotted lines, and the arm $r'$ is shown in full lines in its vertical position. By turning the exterior crank $r^2$ (and with it $r'$) in the direction shown by the arrow, the interior arm $r'$ will again raise the arm $x^5$ to its vertical position, where the pin $c^6$ engages the notch in armature-lever $z^5$. The depression of the spring $r^3$ allows the arm $r'$ to pass on and make a complete circuit to its normal vertical position, where it is again arrested by the stop $s'$. The lug $r^7$ on the arm $x^5$ engages the spring-stop $r^3$ to prevent $r'$ from being turned backward. The stop $S'$ is out of line with the lug $r^7$, and the latter will not prevent the movement of the pin $r^4$ when the stop $S'$ has been depressed.

The mechanisms at F F', &c., which are in conjunction with the levers $a\, b\, c$, &c., have reciprocating bars P, which are actuated by rods $i^6$, slidable within protecting-tubes. One end of each of these rods is in contact with the bar P, and the other connects with a bell-crank lever $h^6$, which is moved by the depression of the lever $a$, and it is returned by the spring $c^5$ acting upon the lever, or by any other suitably-arranged spring. The lever $c$ at the opposite side of the mechanism F has contact-pieces $e^5 f^5$, from which wires lead, as shown, one wire 29 to a local battery M, and the other to one part of the main-line wire 7 by a short branch. Above the lever are similar pieces $g^5\, g^6$, to each of which one end of the main-line wire 7 is connected, so that when the lever is raised to its normal position these contacts are connected and the main-line circuit is continuous, but when depressed the local-battery current is conducted through the contact-pieces $e^5$ and $f^5$, as previously described. Returning to the lever $e$, which acts to set the signal C at "safety," this lever acts to operate a bell-crank lever $h^5$, (shown in Fig. 3,) and this lever is connected at a rod $i^5$ with another bell-crank lever $j^5$, which actuates a rod $k^5$, extending upward into the signal-post C, and when this rod is thus moved upward it actuates the mechanism by which the indicating-hand $m^5$ is moved backward over the dial to indicate the moving of the train away from that point.

The mechanism shown in section and on an enlarged scale in the lower right-hand corner of Fig. 2, Sheet 1, is, for convenience of explanation, shown connected with the lever $d$, by the action of which the indicator on the dial will be moved. Therefore this particular mechanism may be considered to represent either the one at H' or C' at the opposite end of the block. This mechanism is operated as follows: When the rod $k^5$ is moved up, it acts through a branch $k^6$, which is hinged to it to move a gear-wheel $n^5$. This is done by means of pins $o^5$, projecting from the side of the gear-wheel, and these pins are engaged by a fork in the upper end of the rod $k^6$, so that when it is pushed upwardly it rotates the gear a distance sufficient to move the indicator $m^5$ over one of the spaces on the dial, and the rod $k^5$ $k^6$ returns to its normal position as soon as the lever is released. The indicator is held at that point by a pawl $s^5$, which engages a notch on the periphery of a disk $r^5$. This disk is rotated by a pinion $q^5$ upon the same shaft engaging the teeth of the gear-wheel $n^5$. A weight $p^5$ is suspended from the cord or chain passing around a drum upon the shaft of the gear and indicator, and whenever the latter is relieved from the holding device it will be rotated by the movement of the weight and the index-finger moved in the opposite direction from that above described. The weight $p^5$ connected with each of the signals is suspended by a rod $q^4$. This rod has the contact-springs $o$ upon each side and adapted to form contact with plates $q^6$ $q^7$ $q^8$, to which wires 2, 5, and 41 are respectively connected. The pawl is disengaged from the ratchet to allow the weight to turn the signal to "danger," which is to be set to the position of "clear" by the passage of the train over the lever at $e$.

The signals at C' and H' are set to "danger" by the passage of the train over the lever $d$. This makes connection between the wire 2 and the local battery L and the main-line wire 1 by disconnecting wire 1 and 1' and connecting 1 and 2 by means of the contact operated as previously described.

The wire 1 communicates directly with the signals at H' and C' by a current from battery L, which passes through the wire 2 to the lever $d$ when $d$ is depressed, thence to wire 1 through the standing contacts of lever $f^3$ at the opposite end of the block, to 1' to the magnet $u^5$ of the signal H', and thence through the wire 1 to the magnet $u^5$ of the signal C', returning through the wire 8 to battery L, thus completing the circuit. The lever $f^3$ is constructed and connected the same as the lever $d$, to be actuated by a train from the left to operate the signals D E. Each of the levers S$^5$ at H' C' is fixed upon a lever $t^5$, the opposite end of which carries an armature which is attracted to the magnet $u^5$ when an electric circuit is completed through this magnet. This raises the pawl, disengages it from the disk $r^5$, thus allows the weight $p^5$ to rotate the gear and pinion shaft, and moves the index forward over the dials at H' C' to show that the train is approaching within that section. When the magnet $u^5$ is energized, the pawl $s^5$ will immediately rise and release the disk $r^5$, but at the next instant the magnet $u^5$ will be deënergized, and, consequently, the pawl $s^5$ will again drop, so as to raise the point $s^6$ out of the way of the notch to allow it to pass this point and complete a revolution. If the train passes over the depression-lever $d$ without stopping, the armature is instantly released and the disk $r^5$ makes one revolution, which allows the index-finger to move forward one point on the dial, when it is again arrested by the pawl. If the train is stopped, so that the lever is held down for some time, the disk will be engaged by the point $s^6$ at the opposite end of the pawl, and the disk will not complete this revolution until the lever is again released.

The weight $p^5$ at each of the visible signals C' H' is suspended by a rod $q^4$ and with it the contact-springs $o$ and $o'$ are connected. The rod has the contact-springs upon each side adapted to form connection between the rod and wire 41, and either the wire 2 or 5 by means of contact-plates $q^6$ $q^7$ $q^8$.

When the indicator at H' is at "zero" or "safety," a standing connection is established between wires 41 and 2, and through them with the battery J', but as soon as the signal of an approaching train is displayed upon the indicator at H' and C' the mechanism is started as before described, and as the rod $q^4$ moves down it disconnects the wires 41 and 2 and connects 41 and 5 through the contact $q^7$ and $q^8$ and thence to the body of the lever $f^3$. The return-wire 43 to the battery J' connects with the track-rail B opposite to $f^3$ through wire 3, and if a train arrives at this point from the left the current will pass through the engine-brake-actuating mechanism and will arrest the train automatically. After leaving the lever $d$ the roller on the engine next depresses the lever at $h$ and forms a contact which connects the local battery at L with the main-line wire 7 through the wire 2. This passes a current through all the mechanisms at F F' F$^2$ F$^3$, &c., and thus acting upon the electromagnets $i$ $i'$ releases the levers $t'$ at F F', which are dropped and thus connect the local batteries M M', &c., with their respective levers $b$ $b'$. When the train leaves the lever $h$, which is the last of the "station-levers," so called, the engine-drum next forms contact with the centrally-disposed lever $a$, which is the first of the levers connecting with the mechanism F. This lever $a$ is depressed by the engine-drum, and acts through the bell-crank lever $h^6$, connecting-rod $i^6$, to push the vibrating bar P forward, and by its action the swinging lever $t'$ will be moved into its normal position by a lug $p'$, projecting from the bar P, as shown.

The wires 27 and 22 are shown connected with respective contact-springs $m\ n$, and the drop-lever $t'$ when it falls passes between them, thus forming a connection between the wires. The upper end of this lever is held up in a recess made in the armature which extends from the magnet $i$, so that when the latter is energized it will release the lever $t'$ from the armature and let it drop, and, consequently, its lower end falling between the contact-springs connects the wires 27 and 22. The lever $t$ upon the opposite side of the mechanism, in a similar manner, would form connection with its respective wires 27 and 29. When the lever $t'$ is released, it falls upon the lug $p'$ of the bar P and the shaft of the lever passing between the insulated springs $m$ and $n$, as previously described, will make the connection between the two wires which connect with the springs. When the bar is again pushed forward, the action of the lug against the shank of the lever $t'$ will again raise it up so as to engage the recess in the armature, and it will then be held in this position, the contact between the springs $m$ and $n$ being thus broken. When this occurs, by reason of the engine-drum depressing the lever $a$, it immediately cuts off the current from the lever $b$ and the engine-drum can then pass over this lever without any current being conveyed through it to actuate the brake mechanism. When the train passes over the lever $b$, the movement depresses the vertically-sliding bar N, and by means of a rack G at its lower end engaging with a corresponding pinion pivoted near it the lever-arm G' will be moved up into a vertical position, where its upper end engages a catch on the horizontal lever R, as shown.

$n^2$ is a switch-lever fulcrumed at X, having one end connected with the vertically-moving bar N, and the other end moving over an insulated two-part arc having contact-points $r$ and $w$ at opposite ends. The forward movement of the bar N moves this switch-lever $n^2$, so as to break contact with $r$ and form contact with $w$. The conducting-wire 6 leads to the fulcrum-point $x$ and through the lever $n^2$ and the contact $r$ to the magnet $i$, which is energized when the lever $n^2$ completes the circuit through the contact $r$, but when it is changed, as just described, it cuts off the connection between the wire 6 and the magnets $i$ and leaves them out of the circuit. The train next passes over the lever $c$, which is depressed, and this movement, acting through the bell-crank lever $x^6$ and the rod $i^6$ at the left of the mechanism F, moves the vibrating bar O forward into a mortise which is made through the bar N, and the lug on the head of the bar O is engaged by a corresponding notch or lug in the mortise in the bar N, thus preventing the bar O from being retracted. This connects the battery M at that point with the lever $b$ through the contacts $o^2 p^2$ and the wires 32 29 27. It also forms a circuit through the wires 33, contacts $q'$ and $s'$, wires 34 and 24, and magnets Q, thus placing these parts in readiness to be operated when a current is established through them later, as will be hereinafter described.

The mechanism at F' is operated by its levers $a'\ b'\ c'$ in the same manner as explained for the mechanism at F.

When the engine reaches the depression-lever $a^2$ of the mechanism $F^2$ and depresses it, it forms a contact which connects through the wires 22 and 21 with the battery $M^2$ at $F^2$, thus sending a current back into the apparatus F (which is the second apparatus to the rear) through the wires 7 33, lever $n^2$, and contacts $w$ at $F^2$, (N being depressed,) contacts $q'$ and $s'$ at F, and wires 34 and 24 to the magnets Q, thence through the wires 35 to the returning-wire 8 to the battery $M^2$ at $F^2$. This energizes the magnet Q at F and releases the drop-lever $q^2$, which action causes the lever R to release the end of the lever G', before described, and the vertical bar N then moves up and takes its normal position. At the same time the horizontal sliding bar O is released by the upward movement of N, with which it was previously engaged, and takes its normal position. When the bar N is up, its upper end completes connection between the separated ends of the main-line wire 7 and the road is then clear for a following train as far as F. When the lever N is thus raised, it breaks the electrical connection with the lever $b$ and the battery M through the contacts $o^2\ p^2$, and the electrical switch $n^2$ takes its normal position and restores the magnet $i$ to the main line. The same effect is produced when the engine passes over $b^2$ and $c^2$ of this mechanism as that described in the operation of the levers $b\ c$ upon the mechanism F.

When the engine reaches the group of depression-levers and apparatus at $F^3$, the levers $a^3 b^3 c^3$ are successively acted upon in the same manner as previously described for the corresponding levers at $F^2$ except that the wire 6 is used to return the current to F' from $F^3$ instead of the wire 7. The train still proceeding reaches the lever $f^2$ near the end of the block or section and depresses it. This breaks the standing connection with the wires 7 and 43 and makes the connection between wires 7 and 41 and battery J'. This completes the circuit, passes the current back through the mechanism at $F^2$, and this returns the parts of $F^2$ to the normal position and clears the line to this point for the following train, the current returning on wires 35 and 8 to battery J'. At the same time the depression of this lever $f^2$ acts upon the mechanism connected with the signal H', corresponding to $f$ and H respectively at the end of the preceding block, and returns this signal to its normal position of "clear" in the same manner as that described for the returning of the signal C at the beginning of the block when the train passed over the lever $e$. The train next reaches the lever $e^2$ in the succeeding block, which corresponds with the lever $e$ at the beginning of the block, and it operates to set the signal C' of this second block at "safety." When this lever is depressed, it makes a connection with the local battery K' through the wires 13 and 6. This completes the circuit through the mechanism at $F^3$ of the block just passed and returns this mechanism to its normal position in the same manner that the mechanisms F' and $F^2$ were returned, as previously described, the current returning on wires 35 and 8 to battery K'. It also relieves lever $d^3$ of its current by reason of one of the contact-springs being moved off of the contact-plate $q^7$ in the signal C', this contact-spring being in all respects similar to that described in the enlarged view in Sheet 1.

Having thus described my invention, what I claim as new, and desire to secure by Letters Patent, is—

1. A combined automatic block and signal system and brake automatic appliance, comprising a series of depression-levers situated near the station, with electrical wires connected therewith, an indicator at the station from which the train is departing, so connected with a lever that its depression by the passing train operates an adjacent signal and returns the first-named signal to "safety," a second lever succeeding the first one and electrically connected with signals at the succeeding station whereby the depression of the second lever indicates the approach of the train with the section, a series of check-levers and electrical connections situated in groups between the stations for operating the train mechanism, a third lever at the departure station with electrical connections through the groups of levers, whereby the depression of said third lever by the passing train sets the mechanism of the groups throughout the section in condition to check progress of an opposing train.

2. In a railway signal apparatus, a series of depression-levers arranged in groups at stated intervals apart between stations, levers arranged near the station and adapted to be actuated by a passing train, electrical connections between said station-levers and the groups along the line whereby the passing train sets the mechanism of the groups throughout the section in condition to check the progress of an opposing train, and mechanism and batteries arranged with relation to each group of levers so that the passage of the train over the first of said levers actuates the mechanism connected therewith and cuts off the electrical connection through the second lever whereby the train passes over the second lever without interruption, substantially as herein described.

3. A train signaling device, consisting of a series of depression-levers arranged in groups of three at intervals along the line between stations, a lever near the station from which the train departs, and electrical connections between it and the groups of levers along the line, mechanism connected with each of said groups of levers which is actuated by the passage of the train over the station-lever, whereby said mechanism in the groups between the stations is set in condition to check the progress of an opposing train, connection between the first lever of the group and the mechanism connected therewith whereby the passage of the train over the first lever cuts out the current from the second lever and the train passes over said second lever without interruption, a connection between said second lever and the mechanism, whereby the depression of said lever sets the mechanism and moves a switch to change the electrical circuit and a magnet in said mechanism is cut out of the circuit, substantially as herein described.

4. In a railway signal device, the groups of depression-levers situated at intervals between stations and adapted to be successively depressed by mechanism upon the passing train, a mechanism and battery connected with the levers of each group so that the passage of the train over the first lever breaks the electrical circuit through the second lever, the passage of the train over the second lever sets a portion of the mechanism, changes a switch and cuts the magnet of said mechanism out of the circuit, and the passage of the train over the third lever again makes connection between the central lever and the battery, whereby the passage of a succeeding train over said lever will operate the actuating device upon said succeeding train and arrest said train thereby protecting the first-named train from rear collisions, substantially as herein described.

5. In a railway signal device, a series of depression-levers arranged between the rails of the track in groups and at intervals between stations, mechanisms upon the engine of each train whereby said levers are successively depressed by the passing train, electrical connections between the levers adjacent to the stations through which visible signals are set at the succeeding station when the train leaves the station, electrical connections with the groups of levers whereby the mechanism connected with each of said groups is successively actuated by the passing train, connections whereby the passing of the train over the first lever of a group cuts out the electrical circuit through the second lever, the passage over the second lever sets the mechanism to change the electrical circuit and cut a magnet of the mechanism out of the circuit, the passage of the train over the first lever of the group cuts the central lever of the second preceding group behind out of the circuit so that a following train is not stopped at that group by the brakes being automatically applied, a lever situated at each station and electrical connections with the visible signal at that station so that the passage of the train over said lever restores the visible signal to its normal position, substantially as herein described.

6. In an electrical signal apparatus, the depression-levers hinged at stated points between the rails, springs situated beneath the movable ends of the levers whereby they are normally held up, a drum fixed to an axle of each train adapted to depress the lever by contact therewith, bell-crank levers fulcrumed beneath the depression-levers, rods connecting said bell-crank levers, a mechanism including the sliding bar N, the vibrating bar P and the swinging lever $t'$ and their connections, beneath the track with relation to said depression-levers whereby the passage of a train over the lever depresses it and actuates the bell-crank lever and connecting-rod and through this sets the mechanism, substantially as herein described.

7. In a railway signal device, depression-levers having one end hinged at points between the lines of track and the other end adapted to be depressed by a drum upon an axle of a train whenever said train passes over the lever, a returning-spring by which it is normally held up, contacts $g^5$, $g^6$ through which and the lever a standing connection is made when the lever is up and broken when it is depressed, and contacts $e^5$, $f^5$ situated below the lever whereby a connection is made between a local battery and the main line at one side of the lever when the latter is depressed, substantially as herein described.

8. In a railway signal device, visible signals consisting of dials with indicator-hands adapted to move over them, mechanism consisting of the gear $n^5$ $q^5$ and a ratchet-disk $r^5$ and pawl, a depression-lever hinged so as to be acted upon by a drum upon the passing train, bell-crank levers and connecting-rods whereby the depression of a lever actuates the gearing and moves the indicator over the dial so as to return it to its normal position whenever a train passes it, substantially as herein described.

9. In a railway signal device, a depression-lever, bell-crank levers and connecting-rods actuated thereby, an indicator and a dial over which the indicator is moved and returned to its normal position by the action of the levers, a drum upon the indicator-shaft and a weight suspended therefrom, a pawl and ratchet-disk whereby the indicator is normally held at the position in which it is left by the action of the levers, an electromagnet and connecting-wires, and mechanism whereby said magnet is energized when the train enters the section preceding said signal, an armature upon which the pawl is fixed, said armature being attracted when the magnet is energized whereby the pawl is released and the weight operates to move the indicator forward a space upon the dial to show that a train is approaching within the section, substantially as herein described.

10. A railway signal and brake-actuating device consisting of a series of depression-levers fulcrumed between the tracks, drums mounted upon the engine-axle of each train whereby said levers are successively depressed, visible signals which are set by said levers, first, to set back a previously-operated signal, and second, to show at the next succeeding station that it has entered upon the preceding section, levers arranged in groups of three at intervals between the stations, a battery and wires connecting with the central lever of said series, a mechanism upon the locomotive whereby a valve is opened to allow air to pass from the train-pipe to actuate the brake apparatus, an electromagnet and an armature and stop whereby said mechanism is normally retained in position to close the air-valve when the magnet is not energized, connections made through said magnet, the drum of the engine-axle and the depression-lever and also through the axle of the car and the track whereby the magnet upon the engine is energized when the train passes over the lever and the valve is opened and air permitted to pass to the brake mechanism and automatically arrest the motion of the train, substantially as herein described.

11. The air-valve $w^5$ controlling the passage through which air flows from the engine-reservoir to the train-pipe, the weighted lever $x^5$ so connected as to open or close the valve by its movements, a stop $c^6$, a notched lever $z^5$ engaging the stop and normally retaining the lever in position to close the valve, an electromagnet $e^6$ so placed that when energized it attracts an armature on the stop-lever, and releases the valve-controlling lever, a wire extending from the magnet to the wheel-axle and connecting through it and the wheels with the rails and through them with one pole of a local battery, another wire connecting the magnet with an insulated drum upon the wheel-axle, levers fulcrumed between the rails so that the drum depresses them when passing, and a wire and contact connecting with the opposite pole of the battery, through which the circuit is completed when the lever is depressed, and the air-valve is actuated, substantially as herein described.

12. The depression-levers $a$ $b$ $c$ arranged in groups at intervals between the tracks, a local battery, and a mechanism connected with each group of levers, consisting of the electromagnets $i$ and $i'$, contact making and breaking gravity-levers $t$ and $t'$, wires connecting the magnets with the main line through contacts controlled by said levers, sliding bars O and P, and rods connecting them with the exterior depression-levers $a$ and $c$ of each group, by which they are actuated by a passing train to change the position of the levers $t\ t'$, a vertically-sliding bar N actuated by the central depression-lever $b$ when a train passes, a switch-lever $n^2$, a locking-lever R, and a pawl G' actuated by the movement of the bar N, substantially as herein described.

In witness whereof I have hereunto set my hand.

JAMES G. PEARCE.

Witnesses:
S. H. NOURSE,
GEO. H. STRONG.